United States Patent
Männer et al.

(10) Patent No.: US 10,513,564 B2
(45) Date of Patent: Dec. 24, 2019

(54) CELLULOSE SUSPENSION, METHOD FOR THE PRODUCTION AND USE THEREOF

(71) Applicant: LENZING AG, Lenzing (AT)

(72) Inventors: Johann Männer, Weyregg (AT); Martina Opietnik, Vöcklabruck (AT); Josef Innerlohinger, Berg im Attergau (AT); Gerhard Reiter, Seewalchen (AT); Markus Hager, Attnang-Puchheim (AT)

(73) Assignee: Lenzing Aktiengesellschaft, A-4860 Lenzing (AT)

( * ) Notice: Subject to any disclaimer, the term of this patent is extended or adjusted under 35 U.S.C. 154(b) by 305 days.

(21) Appl. No.: 15/688,178

(22) Filed: Aug. 28, 2017

(65) Prior Publication Data

US 2018/0044439 A1  Feb. 15, 2018

Related U.S. Application Data (62) Division of application No. 15/027,937, filed as application No. PCT/AT2014/000203 on Nov. 14, 2014, now Pat. No. 9,822,188.

(30) Foreign Application Priority Data

Oct. 15, 2013 (AT) .................. A 796/2013

(51) Int. Cl.
| | |
|---|---|
| *C08B 1/00* | (2006.01) |
| *C08J 3/075* | (2006.01) |
| *C08J 3/12* | (2006.01) |
| *C08L 1/02* | (2006.01) |
| *D21C 5/00* | (2006.01) |

(52) U.S. Cl.
CPC .............. *C08B 1/003* (2013.01); *C08J 3/075* (2013.01); *C08J 3/122* (2013.01); *C08L 1/02* (2013.01); *D21C 5/005* (2013.01); *C08J 2301/02* (2013.01)

(58) Field of Classification Search
None
See application file for complete search history.

(56) References Cited

U.S. PATENT DOCUMENTS

| | | | |
|---|---|---|---|
| 5,024,831 | A | 6/1991 | Kurisaki et al. |
| 5,064,950 | A | 11/1991 | Okuma et al. |
| 5,331,801 | A | 7/1994 | Heifetz |
| 5,369,861 | A | 12/1994 | Ball et al. |
| 5,447,603 | A | 9/1995 | Michalowski et al. |

(Continued)

FOREIGN PATENT DOCUMENTS

| | | |
|---|---|---|
| AT | 287 905 B | 2/1971 |
| AT | 401 779 B | 11/1996 |

(Continued)

OTHER PUBLICATIONS

WO-2013006876-A1—english translation (Year: 2013).*

(Continued)

*Primary Examiner* — Melvin C. Mayes
*Assistant Examiner* — Stefanie J Cohen
(74) *Attorney, Agent, or Firm* — Venable LLP (57) ABSTRACT

The present invention relates to a phase-stable suspension of cellulose II in water, having a high water retention capacity and a cellulose concentration between 0.1 and 5.0% by weight, a method of its preparation, and its use.

6 Claims, 6 Drawing Sheets

(56) References Cited

U.S. PATENT DOCUMENTS

| | | |
|---|---|---|
| 5,481,864 A | 1/1996 | Wright |
| 5,589,125 A | 12/1996 | Zikeli et al. |
| 5,601,767 A | 2/1997 | Firgo et al. |
| 5,609,676 A | 3/1997 | von der Eltz |
| 5,795,488 A | 8/1998 | Kalt et al. |
| 6,010,594 A | 1/2000 | Henricson et al. |
| 6,183,865 B1 | 2/2001 | Yabuki et al. |
| 6,527,987 B1 | 3/2003 | Yabuki et al. |
| 9,133,570 B2 | 9/2015 | Lightman |
| 9,163,095 B2 | 10/2015 | Innerlohinger et al. |
| 2001/0050153 A1 | 12/2001 | Wajer et al. |
| 2002/0037407 A1 | 3/2002 | Luo et al. |
| 2002/0081428 A1 | 6/2002 | Luo et al. |
| 2002/0124366 A1 | 9/2002 | Hirsch |
| 2002/0189035 A1 | 12/2002 | Ruf |
| 2003/0138473 A1 | 7/2003 | Koblish et al. |
| 2004/0131690 A1 | 7/2004 | Lynch |
| 2006/0144534 A1 | 7/2006 | Paren et al. |
| 2007/0249774 A1 | 10/2007 | Guzauskas |
| 2010/0139875 A1 | 6/2010 | Paren et al. |
| 2010/0209708 A1 | 8/2010 | Braun et al. |
| 2010/0297445 A1 | 11/2010 | Guentherberg et al. |
| 2014/0041821 A1 | 2/2014 | Graveson et al. |
| 2014/0182801 A1 | 7/2014 | Hawkins et al. |
| 2015/0136346 A1 | 5/2015 | Bogren et al. |
| 2015/0291762 A1 | 10/2015 | Watanabe et al. |
| 2016/0237619 A1 | 8/2016 | Weilach et al. |
| 2016/0257806 A1 | 9/2016 | Haubl et al. |
| 2016/0326671 A1 | 11/2016 | Schrempf et al. |
| 2016/0369456 A1 | 12/2016 | Flynn et al. |

FOREIGN PATENT DOCUMENTS

| | | | |
|---|---|---|---|
| AT | 515152 A1 | 6/2015 | |
| CN | 102199310 A | 9/2011 | |
| CN | 102660791 A | 9/2012 | |
| CN | 102677230 A | 9/2012 | |
| EP | 0 356 419 B1 | 12/1992 | |
| EP | 0 584 318 B1 | 5/1996 | |
| EP | 0 781 356 B1 | 7/1998 | |
| EP | 0 717 131 B1 | 11/1998 | |
| EP | 0 671 492 B1 | 9/1999 | |
| EP | 2 589 689 A2 | 5/2013 | |
| GB | 685843 A | 1/1953 | |
| JP | 08239504 A | 9/1996 | |
| WO | 02/057319 A2 | 7/2002 | |
| WO | 2004/043329 A2 | 5/2004 | |
| WO | 2009/036480 A1 | 3/2009 | |
| WO | 2009/037146 A1 | 3/2009 | |
| WO | 2009/065891 A1 | 5/2009 | |
| WO | 2010/071910 A2 | 7/2010 | |
| WO | 2011/077446 A1 | 6/2011 | |
| WO | 2011/130276 A2 | 10/2011 | |
| WO | 2013/006876 A1 | 1/2013 | |
| WO | WO-2013006876 A1 * | 1/2013 | ............ C08J 3/075 |
| WO | 2015/077807 A1 | 6/2015 | |

OTHER PUBLICATIONS

M. Abu-Rous et al., "Visualisation of the Nano-Structure of Tencel® (Lyocell) and Other Cellulosic as an Approach to Explaining Functional and Wellness Properties in Textiles," Lenzinger Berichte 85, pp. 31-37 (2006).

Gericke et al., "Functional Cellulose Beads: Preparation, Characterization, and Applications," Chemical Reviews, 113, pp. 4812-4836 (2013).

Trygg et al., "Physicochemical Design of the Morphology and Ultrastructure of Cellulose Beads," vol. 93, Issue 1, pp. 294-299 (2013).

M. Opietnik et al., "TENCEL® Gel—A Novel Cellulose Micro Suspension," Lenzinger Berichte 91, pp. 89-92 (2013).

L. Youhanan, "Enviommental Assessment of Textile Material Recovery Technique: Examining Textile Flow in Sweden," pp. 18-19 (2013).

International Preliminary Report on Patentability and Written Opinion of the International Searching Authority issued in International Application No. PCT/AT2014/000202 (9 pages).

International Preliminary Report on Patentability and Written Opinion of the International Searching Authority issued in International Application No. PCT/AT2014/000203 (6 pages).

Written Opinion of the International Searching Authority issued in International Application No. PCT/AT2014/000205 (5 pages).

International Search Report for PCT/AT2014/000202 dated May 12, 2015.

International Search Report for PCT/AT2014/000203 dated May 21, 2015.

International Search Report for PCT/AT2014/000205 dated Mar. 10, 2015.

Zhang, et al., "Structure and Properties of Regenerated Cellulose Films Prepared from Cotton Linters in NaOH/Urea Aqueous Solution," Ind. Eng. Che. Res., 40, pp. 5923-5928 (2001).

Röder et al., "Comparative Characterisation of Man-Made Regenerated Cellulose Fibres," Lenzinger Berichte, 87, pp. 98-105 (2009).

Björquyist et al., "Textile qualities of regenerated cellulose fibers from cotton waste pulp," Textile Research Journal pp. 1-8 (2017).

* cited by examiner

SD2 in EtOH

Fig. 5:

SD21 in EtOH

Fig. 6: SEM-microscope-pictures of sample SD21

CELLULOSE SUSPENSION, METHOD FOR THE PRODUCTION AND USE THEREOF

The present application is a division of U.S. patent application Ser. No. 15/027,937, filed on Apr. 7, 2016 (published as US Patent Application Publication No. 2016-0237171 A1) which is a national stage filing under 35 U.S.C. § 371 of International Patent Application No. PCT/AT2014/000203, filed Nov. 14, 2014 (published as WO 2015/054712 A2), which claims priority to Austrian Patent Application No. A 796/2013 filed Oct. 15, 2013, the entire disclosure of each of which is incorporated by reference herein.

BACKGROUND OF THE INVENTION

Field of the Invention

The present invention relates to a novel cellulose suspension having a cellulose II structure, a cost-effective method for its preparation, and the use of this cellulose suspension for the preparation of cellulose particles, among other things. Such suspensions are often referred to as "gels", and in the present invention both terms shall be construed as having the same meaning.

DESCRIPTION OF RELATED ART

Prior Art

It has long been known that, according to the so-called lyocell process, fibers and other molded articles can be obtained from a solution of cellulose in an aqueous, organic solvent. More specifically, an aqueous solution of NMMO (N-methyl-morpholine-N-oxide) has been the solvent used on a commercial scale for more than twenty years. Typically, spinning dopes containing approximately 13% by weight of cellulose are used in the related production facilities. Pulp is a preferred cellulosic raw material, but, depending on the circumstances, other cellulosic raw materials such as cotton linters can also be employed.

All cellulosic raw materials of a natural origin have a so-called cellulose I structure. This structure differs significantly—and this can be determined clearly by means of known x-ray scattering methods—from the cellulose II structure that the molded articles produced according to the lyocell process ultimately end up having.

WO2013/006876A1 first cites various prior art patents and publications that describe the preparation of suspensions from nanofibrillar cellulose and of fibrous cellulose gels from pulp, respectively. All these products have a cellulose I structure, as they were produced from natural cellulosic raw materials, without interim dissolution.

Furthermore, the patent application WO2013/006876A1 describes the preparation of a cellulose gel having a cellulose II structure from 2% lyocell spinning dope. According to prior art, for the preparation of cellulose gel from 2% lyocell spinning dope, the spinning dope can, in a first step, be precipitated in water in a stir reactor. Instead of that, according to WO2013/006876A1, the freely flowing spinning dope is cooled to below its solidification temperature, and the solidified cellulose solution is comminuted into granules. The thus produced cellulose granules are washed free of NMMO and are subsequently comminuted, with a consistency of 2% cellulose, in deionized water by wet grinding in a colloid mill. This yields a microsuspension having a stable, gel-like character. In this connection, the properties of the cellulose gel are described by the water retention capacity (WRC) and the particle size measured by laser diffraction.

WO2013/006876A1 expounds by way of examples that it is not possible to use the same method to also produce an equivalent cellulose suspension having gel-like characteristics from granules or fibers that were made from a 13% spinning dope instead of the 2% spinning dope according to the invention. For comparison, Table 1 shows the WRC results from WO2013/006876A1. When using a 13% spinning dope in the inventive method according to WO2013/006876A1 instead of the inventive 2% spinning dope, one obtains a cellulose suspension having a WRC of only 250%. This is in the same range as that of suspensions made by comminuting of lyocell ribbon fibers (WRC=270%) or Saiccor pulp (WRC=180%). By contrast, suspensions according to WO2013/006876A1 made from a 2% spinning dope are stable without phase separation and have a WRC of about 800%.

Another feature set forth in WO2013/006876A1 is the relationship between the WRC and the viscosity as a function of the cellulose concentration of microsuspensions that contain between 1 and 3% by weight of cellulose (see Table 4 of WO2013/006876A1). These values show that in the inventive cellulose gels of WO2013/006876A1 the WRC increases as the cellulose concentration rises, but that also the viscosity increases to such a large extent that gels with a higher cellulose concentration can practically no longer be processed because of their high viscosity.

A substantial disadvantage in the preparation of gel from 2% lyocell spinning dope is the high expense involved in the recovery of NMMO. As compared to a 13% spinning dope, the costs of NMMO recovery with a 2% spinning dope are more than 6 times higher, due to the lower cellulose/NMMO ratio of about 1:6. This applies to both variable and fixed operating costs (energy costs, etc.), but also to investment costs and depreciation, respectively.

Another disadvantage is that the existing lyocell production facilities only produce spinning dopes having approximately 13% by weight of cellulose. This means that a separate production facility would have to be built for the preparation of 2% spinning dope.

The patent application WO2009/036480 A1 describes the preparation of substantially spherical cellulose II powder by grinding of cellulose granules that were precipitated from the lyocell process, washed free of NMMO and dried. The cellulose II powder resulting therefrom consists of average particle sizes from 1-400 µm.

In practice, the preparation of cellulose particles according to WO2009/036480 A1 is as follows: In a granulating mill, a lyocell spinning dope is coagulated with water into irregular granules having particle sizes from 0.5-1.5 mm. These granules are washed free of NMMO by means of water and dried. In a first coarse grinding step using impact mills or long gap mills, the dry granules are ground down to particle sizes having an average diameter of 50-200 µm. Then, in a second fine grinding step using jet mills, average particle sizes of no less than 5 µm are produced. This fine grinding step is highly time-consuming, which is why the capacities are very reduced and thus very costly.

U.S. Pat. No. 5,064,950 describes the preparation of crosslinked cellulose II particles.

WO 2004/043329 A2 describes the preparation and use of cellulose microbeads having a diameter of approximately 15 µm. They are obtained by precipitating the cellulose from a mixture of viscose and sodium polyacrylate, followed by acidic hydrolysis.

U.S. Pat. No. 5,024,831 also describes spherical cellulose particles having an average diameter from 3-50 μm and makes reference to various Japanese patents as regards their preparation. Due to the precipitation from the viscose process, the particles described therein partly consist of cellulose derivatives and cellulose II.

The last three cited publications all describe methods whose final products contain not only the cellulose, but also other substances that are undesirable in many types of use.

Object

In comparison with this prior art, the object was to provide a cellulose suspension that can be produced more cost-effectively and is easier to process than prior art cellulose suspensions. Furthermore, the object was to provide a suitable method of the preparation of such a suspension as well as novel uses therefor, particularly such methods and uses where there will not exist any undesirable accompanying substances apart from the cellulose.

DESCRIPTION

The above described object is solved by a phase-stable suspension of underivatized cellulose II in water, having a high water retention capacity (WRC), a cellulose concentration between 0.1 and 4.0% by weight, and in which the viscosity (in [Pa*s] at a shear rate of 50 s$^{-1}$) and the water retention capacity (in %) as a function of the cellulose concentration x (in % by weight, related to the total quantity of the suspension) have the following relationship:

$$(\text{viscosity at } 50 \text{ s}^{-1}/\text{WRC})*10000 < 0.4038*x^{2.8132}$$

The relationship which can be described in this way and which has been found in the suspension according to the invention is unique, especially for underivatized cellulose. The suspensions prepared according to the state of the art, e.g., to WO2013/006876A1, from spinning dopes having 2% by weight of cellulose II, are in each case significantly above the range delimited by this formula (see FIG. 2).

In addition, the property range according to the invention is also limited in a downward direction by the relationship:

$$(\text{viscosity at } 50 \text{ s}^{-1}/\text{WRC})*10000 > 0.0201*x^{2.366}$$

Basically, it can be found that the lower the cellulose concentration of the spinning dope that suspensions are made of, the closer to the upper range limit they will be.

A cellulose concentration in the suspension between 0.5 and 5.0% by weight, particularly between 1.0 and 4.0% by weight, is preferred.

Figure 1:
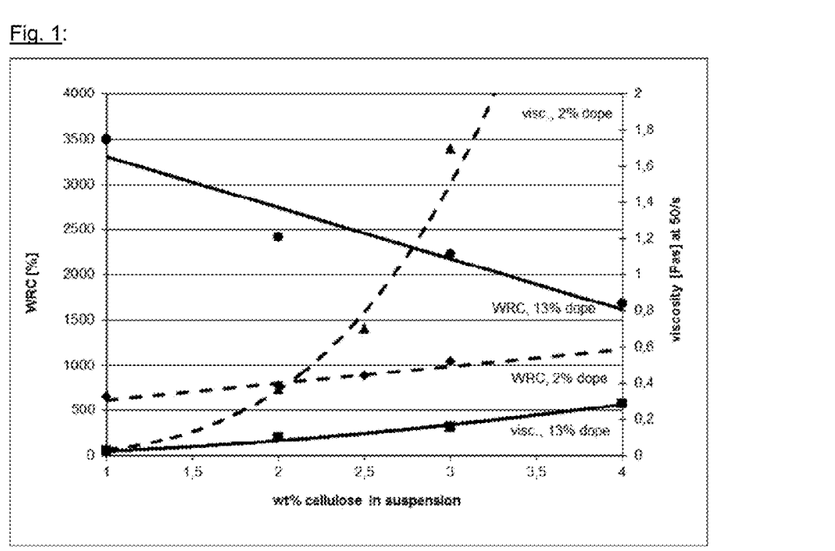
FIG. 1 is a graph comparing the WRC (water retention capacity) and the viscosity of the cellulose suspensions from Example 3 of the present application to the results from WO 2013/006876.

In terms of its property profile, the suspension according to the invention differs significantly, for example from the cellulose II suspensions set forth in WO2013/006876A1 that are made of 2% spinning dope, especially in that it has a significantly higher water retention capacity (WRC) and a lower viscosity level. This combination of properties, which has been achieved for the first time in the cellulose suspension according to the invention, causes both the productivity of the suspension preparation process and the processability of the suspension to be enhanced considerably. While in the cellulose suspensions known from prior art the WRC increases as the cellulose content in the suspension increases, it can, in suspensions according to the invention, typically even decrease as the cellulose content increases (see FIG. 1).

According to the invention, suspensions are preferred where the viscosity (in [Pa*s] at a shear rate of 50 s$^{-1}$) and the water retention capacity (in %) as a function of the cellulose concentration x (in % by weight, related to the total quantity of the suspension) have the following relationship:

$$(\text{viscosity at } 50 \text{ s}-1/\text{WRC})*10000 < 0.3057*x^{2.5698}$$

Furthermore, also such cellulose II suspensions having the above-mentioned properties are preferred, whose WRC is between 500 and 5000%, particularly between 1000 and 4000%.

The present invention also relates to a method for preparing a phase-stable suspension of cellulose II in water, having a high water retention capacity, characterized by the following steps:

a. Preparing a spinning dope with 10 to 15% by weight of cellulose according to the lyocell process, b. precipitating the cellulose, whereby a material containing NNMO and cellulose is obtained, c. washing the material until it is substantially NMMO-free, d. enzymatic treatment of the moist material which has been washed free of NMMO, e. comminution in a comminuting unit, whereby a coarse cellulose suspension is obtained, f. microcomminution in a high pressure homogenizer into a stable microsuspension.

Not only does this method produce the above-described novel and advantageous cellulose II suspensions, but it is also significantly more cost-effective than for example the prior art method described in WO2013/006876A1. With a cellulose concentration of less than 10% by weight of cellulose in the spinning dope, the NMMO recovery is not cost-effective and the investment costs are too high, and with a cellulose concentration of more than 15% by weight, the spinning dope is no longer readily processable.

In principle, the material obtained in step b. may have various shapes. For example, it can be granules, fibers, fleecelike, fibrous or even spongelike structures. The costs will be lowest if coarse granules are made—for example with an underwater granulator or a granulating mill.

Preferably, the enzyme used in step d. is an endoglucanase or a mixture of endoglucanases and exoglucanases. The enzyme concentration in step d. should preferably be 0.1 to 10.0% by weight.

Preferably, the comminution in step e. is carried out in a comminuting unit such as another granulating mill, a colloid mill, or a refiner.

When precipitating lyocell spinning dopes having cellulose concentrations according to the invention in water or mixtures of water and NMMO, the molded articles produced have an outer skin structure that is more or less compact, depending on the precipitation conditions applied. In each case, they are cellulose II structures with differing ratios of crystalline and amorphous regions. When using the wet grinding process described in WO2013/006876A1, for example by means of a colloid mill, it was not possible to prepare microsuspensions from such a material that was obtained by precipitating a cellulose solution having 10-15% by weight of cellulose.

According to the invention, a high pressure homogenizer is used in the last comminution step. It is typical of this type of device that the comminution is not brought about by shearing, impact or rotor-stator principles, but by a spontaneous relaxation of the highly pressurized grinding liquid and the resulting cavitations and turbulences. The method of the invention is particularly effective if the pressure in the high pressure homogenizer in step f is between 100 and 2000 bar. In order to further improve the effectiveness of the high pressure homogenizer, it should be operated in the form of a loop reactor. In this connection, it is particularly preferable to pass the suspension in step f between 1 and 10 times, preferably 1 to 4 times, through the high pressure homogenizer. This causes the suspension to be heated strongly. In order to avoid any deterioration of the suspension, it may be necessary to provide a cooling option in the suspension circuit, for example by installing a heat exchanger.

Commercially, the method of the invention is particularly interesting if the suspension can also be prepared by means of a spinning dope suited for the production of staple fibers. Therefore, it is advantageous if in step a. of the method of the invention the cellulose concentration in the spinning dope is 12 to 14% by weight.

The present invention also relates to the use of the above-described inventive suspension for the preparation of substantially spherical cellulose particles having a cellulose II structure, a spherical shape, and an average diameter×50 from 1 to 4 µm, the forming of the cellulose particles according to the invention being performed by spray drying.

In principle, the use of the cellulose suspension known from WO 2013006876 A1 (from 2% spinning dope) or of other, comparable cellulose suspensions is also possible in this connection. However, in most cases, it will probably be ruled out, as its preparation is less cost-effective.

The substrate to be dried, i.e., the cellulose suspension according to the invention, is atomized into fine droplets through a nozzle. The droplets are discharged into a separating cyclone together with the hot air flow, and water is evaporated in this process. The particle structure can be influenced via various parameters such as cellulose concentration, spraying nozzle size, or the difference between supply and exhaust temperatures. The cellulose particles obtained in this process have an approximately spherical shape and an average diameter of <1-5 µm. The approximately spherical shape is reflected mainly in the axis ratio (l:d) between 1 and 2.5. The surface of the particles is irregular, and corners and edges become clearly visible under the microscope; however, under the microscope, the particles do not exhibit any fibrous fraying or fibrils. Therefore, we are by no means dealing with spheres having a smooth surface.

Figure 3:
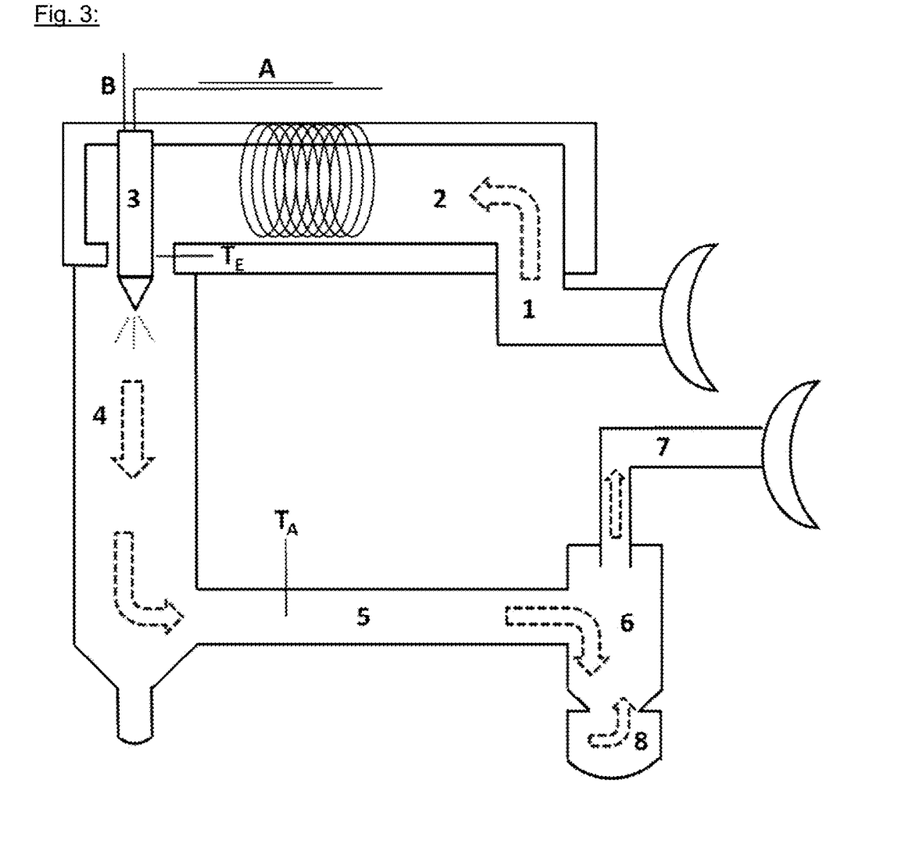
FIG. 3 depicts the principle and the schematic of the spray drying process.

The principle and the schematic of the spray drying process are shown in FIG. 3, wherein:
A: supply of cellulose suspension
B: supply of spray air (=compressed air)
$T_E$: temperature measurement for supply air
$T_A$: temperature measurement for exhaust air
1: suction port for supply air
2: electrical heater
3: spraying nozzle
4: spraying cylinder
5: exhaust air
6: separating cyclone
7: exhaust air outlet filter
8: collector vessel for dried particles Hereinafter, the invention is described by way of examples. However, the invention is expressly not limited to these examples but includes all other embodiments that are based on the same inventive concept.

EXAMPLES

Water Retention Capacity (WRC) Measurement:

For determining the WRC, a defined quantity of suspension is introduced into special centrifuge tubes (with an outlet for the water). Then, it is centrifuged at 3,000 rpm for 15 minutes, whereupon the moist cellulose is weighed right away. The moist cellulose is dried for 4 hours at 105° C., whereupon the dry weight is determined. The WRC is calculated using the following formula:

$$WRC[\%]=(m_f-m_t)/mt*100\ (m_f=\text{moist mass},\ m_t=\text{dry mass})$$

Figure 10:
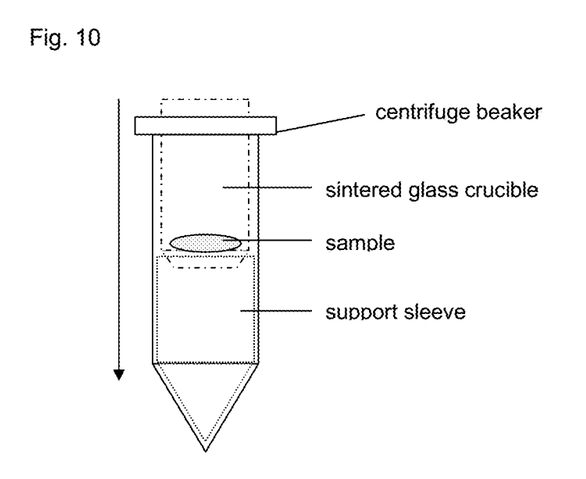
FIG. 10 depicts a supporting sleeve adapted to a sintered glass crucible used as part of the laboratory equipment for measuring the WRC.

Hereinafter, the process steps used to determine the WRC are described in detail:

The water retention capacity (WRC) is a measured value that indicates how much water of a sample is retained after centrifuging. The water retention capacity is expressed as a percentage relative to the dry weight. The following equipment is used: a laboratory centrifuge, e.g., from Hettich, sintered glass crucibles 15 ml with porosity 4, e.g., ROBU H11 of borosilicate glass 3.3; an Eppendorf pipette; Eppendorf pipette tips 10 ml; supporting sleeves (made of cut-off centrifuge beakers) adapted to the sintered glass crucibles—see FIG. 10; a recirculating-air oven; an analytical balance.

Prior to the analysis, the samples must be shaken well. It must be ensured prior to the measurement that there is no remaining water in the supporting sleeves. Eight clean, dry and numbered sintered glass crucibles are weighed-accuracy: 0.0001 g. The support sleeves and the sintered glass crucibles are placed in the centrifuge beakers. An Eppendorf pipette is used to pipette 5 ml each of the suspension to be analyzed into each of the sintered class crucibles. Then, centrifuging is carried out at 3,000 rpm for 15 minutes in the laboratory centrifuge. The crucibles must be wiped off at the bottom immediately after centrifuging. Then, the crucibles are weighed immediately on the analytical balance and the total weight is recorded. The accuracy must be 0.0001 g. Then, the crucibles are left to dry for 4 hours at 105° C. in the recirculating-air oven and left to cool for at least 30 minutes in the desiccator. Subsequently, the dry samples are weighed again (accuracy: 0.0001 g). The determination is carried out in quadruplicate. After the analysis, the crucibles must be cleaned thoroughly with hot water (60-70° C.) and chromosulfuric acid. The subsequent drying of the crucibles is carried out for 4 hours at 105° C. in the recirculating-air oven.

Viscosity Measurement:

The viscosities were measured using a Malvern Kinexus rheometer with a cone plate measuring system (CP4/40 S0687 SS) at a shear rate of 50 s$^{-1}$.

Example 1

Using an underwater granulator, a 13% lyocell spinning dope in 50% NMMO as precipitation bath medium is coagulated into ball-shaped granules, the granules are separated from the precipitation tank, washed free of NMMO with deionized (DI) water, and removed from the remaining washing water by centrifuging. The moist granules are treated at a liquor ratio of 1:15 with 1% enzyme (Endoglucanase Novozym 476) for 90 min at 60° C. under gentle agitation. Then, the enzyme is separated, washed out, and removed by centrifuging. Remaining enzyme is deactivated by brief heating to 90° C. Then, these granules, at a consistency of 2% cellulose, are preground for 15 minutes in deionized water using an IKA MK2000/10 colloid mill and are then formed into a microemulsion by means of a GEA Niro Soavi NS 1001L-2K high pressure homogenizer at 1000 bar and in 4 passes. The material obtained has a WRC of 1661% and is stable without phase separation for more than 2 weeks.

Example 2

Using a granulating mill, a 13% lyocell spinning dope in water as precipitation bath medium is coagulated into irregular granules, separated from the precipitation tank, washed free of NMMO with deionized water, and removed from the remaining washing water by centrifuging. The moist granules are treated at a liquor ratio of 1:15 with 1% enzyme (Endoglucanase Novozym 476) for 90 min at 60° C. under gentle agitation. Then, the enzyme is separated, washed out, and removed by centrifuging. Remaining enzyme is deactivated in the moist granules by brief heating to 90° C. Then, these granules, at a consistency of 2% by weight of cellulose, are preground for 15 minutes in deionized water using a colloid mill and are then formed into a microemulsion by means of a high pressure homogenizer at 1000 bar and in 5 passes. The material obtained has a WRC of 1524% and is stable without phase separation for more than 2 weeks.

Example 3

Using a granulating mill, a 13% lyocell spinning dope in water as precipitation medium is coagulated into irregular granules, separated from the precipitation tank, washed free of NMMO with deionized water, and removed from the remaining washing water by centrifuging. The suspension of the moist granules is diluted with deionized water to 1, 2, 3 and 4% by weight of cellulose, respectively, 1% enzyme (Novozym 476), related to dry cellulose, is added, and it is treated in a colloid mill for 90 min at 50° C. Remaining enzyme is deactivated by brief heating to 90° C. Then, the preground granules are processed into a microemulsion in a high pressure homogenizer at 1000 bar and in 4 passes. The suspensions obtained are stable without phase separation for more than 2 weeks. WRC and viscosity are shown in Table 1.

TABLE 1

|  | Cellulose concentration [%] | Water retention capacity WRC [%] | Viscosity at shear rate 50/s [Pas] |
|---|---|---|---|
| GEA-57C | 1 | 3499 | 0.0232 |
| GEA-58C | 2 | 2422 | 0.098 |
| GEA-59C | 3 | 2228 | 0.154 |
| GEA-60C | 4 | 1686 | 0.282 |

TABLE 2

| Cellulose suspension | | [% by weight] cell. | WRC [%] | | Visc. [Pa * s] | | f = Visc/ WRC * 10000 | |
|---|---|---|---|---|---|---|---|---|
| 2% SpM | 13% SpM | | 2% SpM | 13% SpM | 2% SpM | 13% SpM | 2% SpM | 13% SpM |
| G12 | GEA-57C | 1 | 649 | 3499 | 0.033 | 0.0232 | 0.51 | 0.07 |
| G39 | GEA-58C | 2 | 760 | 2422 | 0.36 | 0.098 | 4.74 | 0.40 |
| G37 | — | 2.5 | 877 | — | 0.696 | — | 7.94 | — |
| G5 | GEA-59C | 3 | 1034 | 2228 | 1.693 | 0.154 | 16.37 | 0.69 |
| — | GEA-60C | 4 | — | 1686 | — | 0.282 | — | 1.67 |

When comparing the WRC and the viscosity of the cellulose suspensions from Example 3 to the results from WO2013/006876A1 (Table 4 therein; spinning dope with 2% by weight of cellulose), it becomes apparent that the property profiles of the samples of Example 3 differ significantly from WO2013/006876A1 (Table 2). This different behavior is also depicted graphically in FIG. 1.

Figure 2:
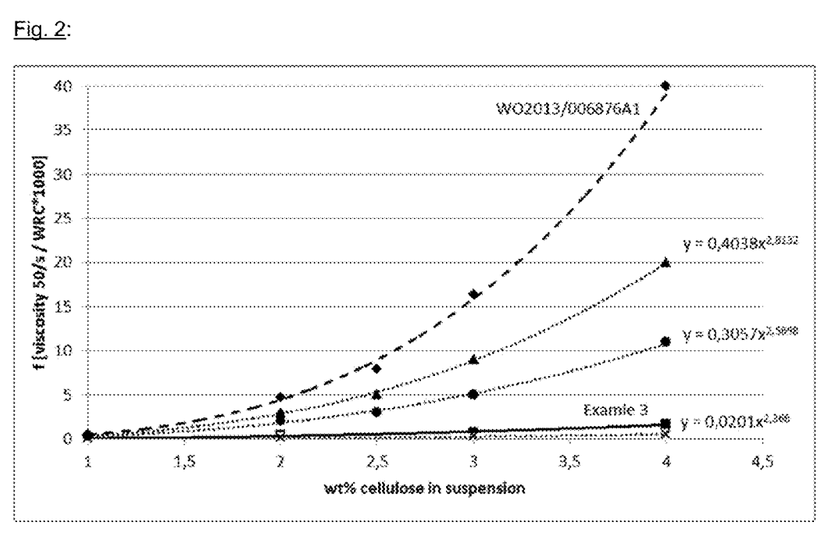
FIG. 2 is a graph comparing the viscosity of suspensions that include increasing the wt % of cellulose from Example 3 of the present invention to the results from WO 2013/006876.

FIG. 2 shows the location of the suspensions according to the invention of Example 3 (continuous line) as compared to the limiting lines of the inventive scope (dotted lines, with the respective equations) and also the location of a prior art suspension according to WO2013/006876A1 (dashed line).

In the following examples, cellulose microsuspensions having different cellulose contents were dried in different conditions in a laboratory spray dryer (Büchi Mini Spray Dryer B-290). The particle size distribution of the samples obtained therefrom was conducted using laser diffraction in ethanol (measuring instrument from Helos).

Example 4

Figure 4:
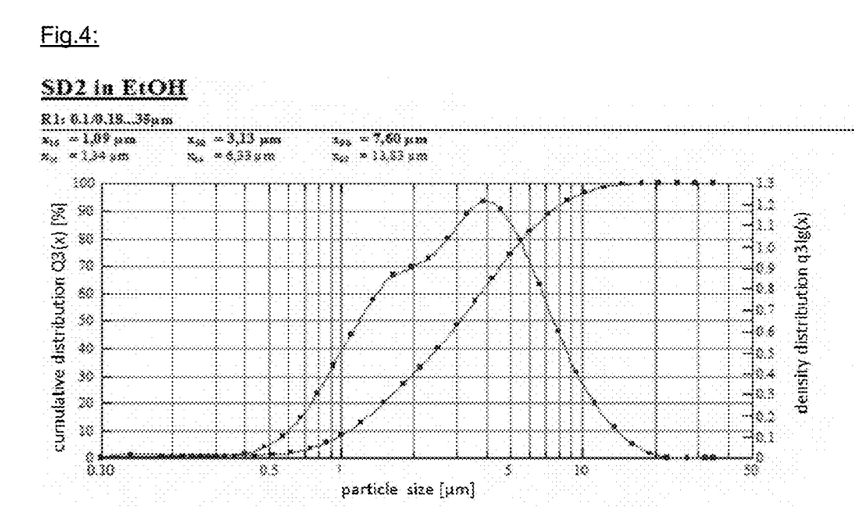
FIG. 4 is a graph of a particle size distribution of an embodiment of the present invention.

A cellulose microsuspension according to the invention, prepared in accordance with Example 2 and containing 2% by weight of cellulose, was dried at 180° C. supply air temperature and 62° C. exhaust air temperature. The nozzle size was 1.5 mm. The particle size analysis yielded the following values: $x_{10}$=1.09 µm, $x_{50}$=3.13 µm, $x_{90}$=7.6 µm. FIG. 4 shows the particle size distribution.

Example 6

Figure 5:
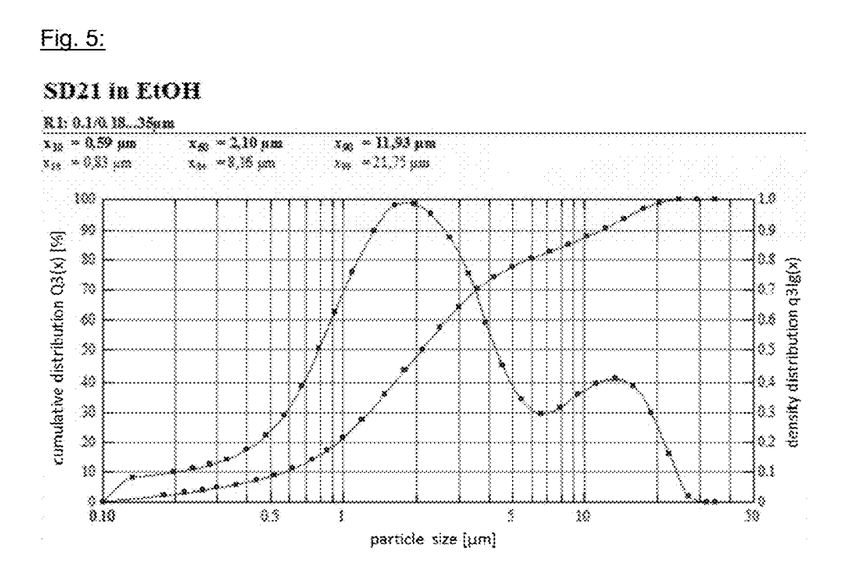
FIG. 5 is a graph of a particle size distribution of another embodiment of the present invention.
Figure 6:
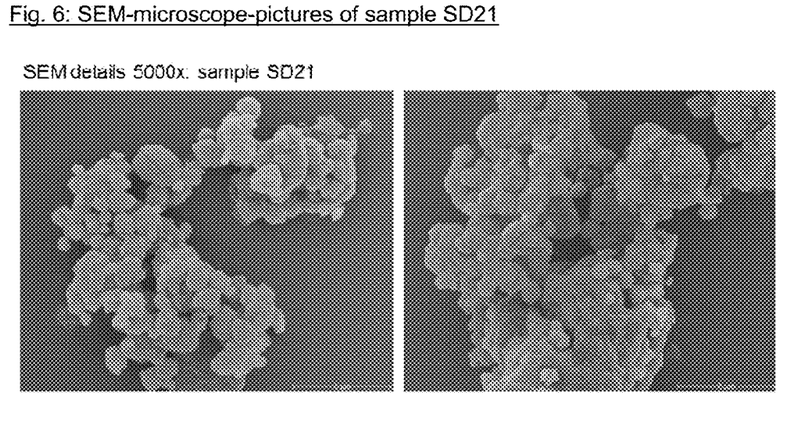
FIG. 6 depicts scanning electron microscope images of particles produced in accordance with the embodiment of FIG. 5.

A cellulose microsuspension according to the invention, prepared in accordance with Example 2 and containing 0.25% by weight of cellulose, was dried at 220° C. supply air temperature and 124° C. exhaust air temperature. The nozzle size was 1.5 mm. The particle size analysis yielded the following values: $x_{10}$=0.59 µm, $x_{50}$=2.1 µm, $x_{90}$=11.93 µm. FIG. 5 shows the particle size distribution, FIG. 6 shows scanning electron microscope images of the particles produced. The particles have a substantially spherical, but not ball-shaped form with an uneven surface. Corners and edges are clearly visible in the microphoto.

Example 7

Figure 7:
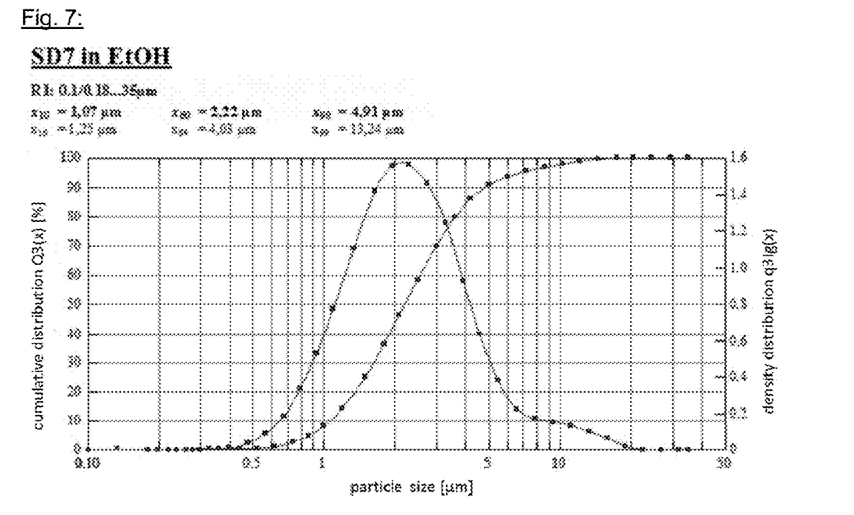
FIG. 7 is a graph of a particle size distribution of a further embodiment of the present invention.

A cellulose microsuspension according to the invention, prepared in accordance with Example 2 and containing 0.5% by weight of cellulose, was dried at 180° C. supply air temperature and 83° C. exhaust air temperature. The nozzle size was 1.4 mm. The particle size analysis yielded the following values: $x_{10}$=1.07 μm, $x_{50}$=2.22 μm, $x_{90}$=4.91 μm. FIG. 7 shows the particle size distribution.

Example 8

Figure 8:
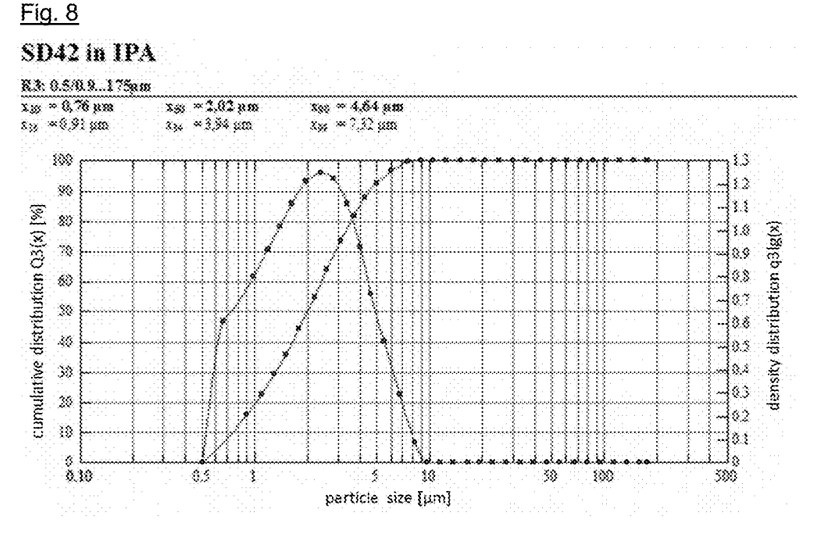
FIG. 8 is a graph of a particle size distribution of another embodiment of the present invention.
Figure 9:
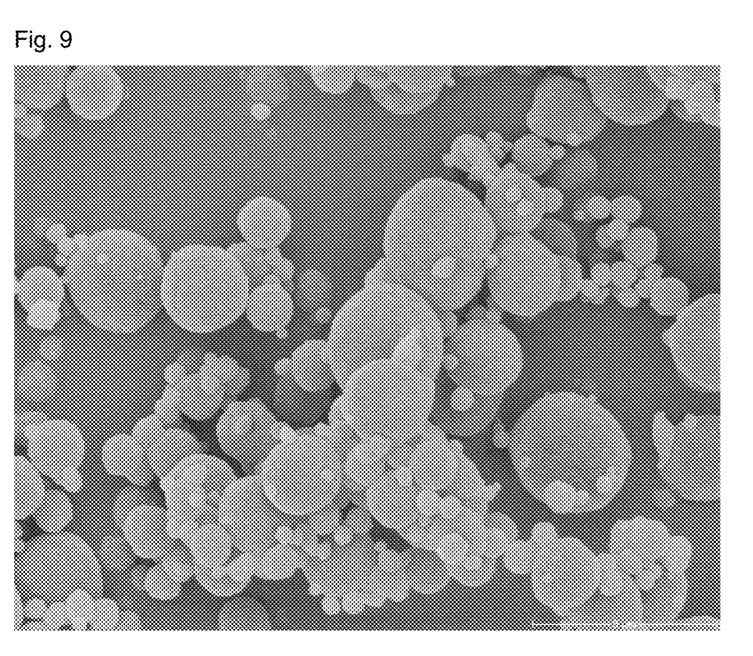
FIG. 9 is a scanning electron microscope image of the embodiment of FIG. 8.

A cellulose microsuspension according to the invention, prepared in accordance with Example 2 and containing 4% by weight of cellulose and 0.04% of Sokolan PA30CL as emulsifier, was dried at 180° C. supply air temperature and 72° C. exhaust air temperature. The nozzle size was 1.4 mm. The particle size analysis yielded the following values: $x_{10}$=0.76 μm, $x_{50}$=2.02 μm, $x_{90}$=4.64 μm. FIG. 8 shows the particle size distribution. FIG. 9 shows the visual representation in the scanning electron microscope.

What is claimed is:

1. A phase-stable suspension of cellulose II in water wherein said suspension has a cellulose concentration between 0.1 and 5.0% by weight and wherein the viscosity (in [Pa*s] at a shear rate of 50 $s^{-1}$) and the water retention capacity (in %) as a function of the cellulose concentration x (in % by weight, related to the total quantity of the suspension) of said suspension have the following relationship:

$$(\text{viscosity at } 50s^{-1}/\text{WRC})*10000 < 0.4038*x^{2.8132}.$$

2. The suspension as claimed in claim 1, wherein the property range of the suspension is also limited by the relationship:

$$(\text{viscosity at } 50\ s^{-1}/\text{WRC})*10000 > 0.0201*x^{2.366}.$$

3. The suspension as claimed in claim 1, wherein the viscosity and the water retention capacity as a function of the cellulose concentration x have the following relationship:

$$(\text{viscosity at } 50\ s^{-1}/\text{WRC})*10000 < 0.3057*x^{2.5698}.$$

4. The suspension as claimed in claim 1, wherein the WRC is between 500 and 5000%.

5. Use of the suspension as claimed in claim 1 for the preparation of cellulose particles having a cellulose II structure, a spherical shape, and an average diameter $x_{50}$ from 1 to 4 μm comprising spray drying the suspension.

6. The suspension as claimed in claim 4, wherein the WRC is between 1000 and 4000%.

* * * * *